United States Patent [19]
Miller

[11] 3,923,200
[45] Dec. 2, 1975

[54] FEEDER FOR SLEEVE-ENCLOSED EDIBLE CONES

[75] Inventor: Joseph J. Miller, Pickerington, Ohio

[73] Assignee: Big Drum, Inc., Columbus, Ohio

[22] Filed: June 3, 1974

[21] Appl. No.: 475,980

[52] U.S. Cl. .............................. 221/221; 221/298
[51] Int. Cl.² ......................................... B65G 59/10
[58] Field of Search .......... 221/221, 297, 298, 299; 426/132, 139; 53/40

[56] References Cited
UNITED STATES PATENTS

| | | | |
|---|---|---|---|
| 2,228,942 | 1/1941 | Balton | 426/139 |
| 2,934,872 | 5/1960 | Wise | 222/366 X |
| 3,104,780 | 9/1963 | Carter et al. | 221/223 |
| 3,181,728 | 5/1965 | West et al. | 221/221 |
| 3,189,217 | 6/1965 | Cease | 221/298 X |
| 3,472,403 | 10/1969 | Mueller et al. | 221/221 X |

*Primary Examiner*—Robert B. Reeves
*Assistant Examiner*—Francis J. Bartuska
*Attorney, Agent, or Firm*—Mahoney, Miller & Stebens

[57] ABSTRACT

A feeder for feeding edible cones which are enclosed within protective paper cones or sleeves. The enclosed cones are received from a suitable source of supply and formed into rows in receiving sockets on a machine where they are to be filled, treated and sealed. The feeder is such as to ensure feeding of both the protective sleeve and edible cone into the particular socket for receiving it, by providing means for ensuring the stripping of a preceeding sleeve from a following sleeve and the stripping of a preceding cone from a following sleeve in case it adheres thereto if its enclosing sleeve is stripped therefrom.

12 Claims, 13 Drawing Figures

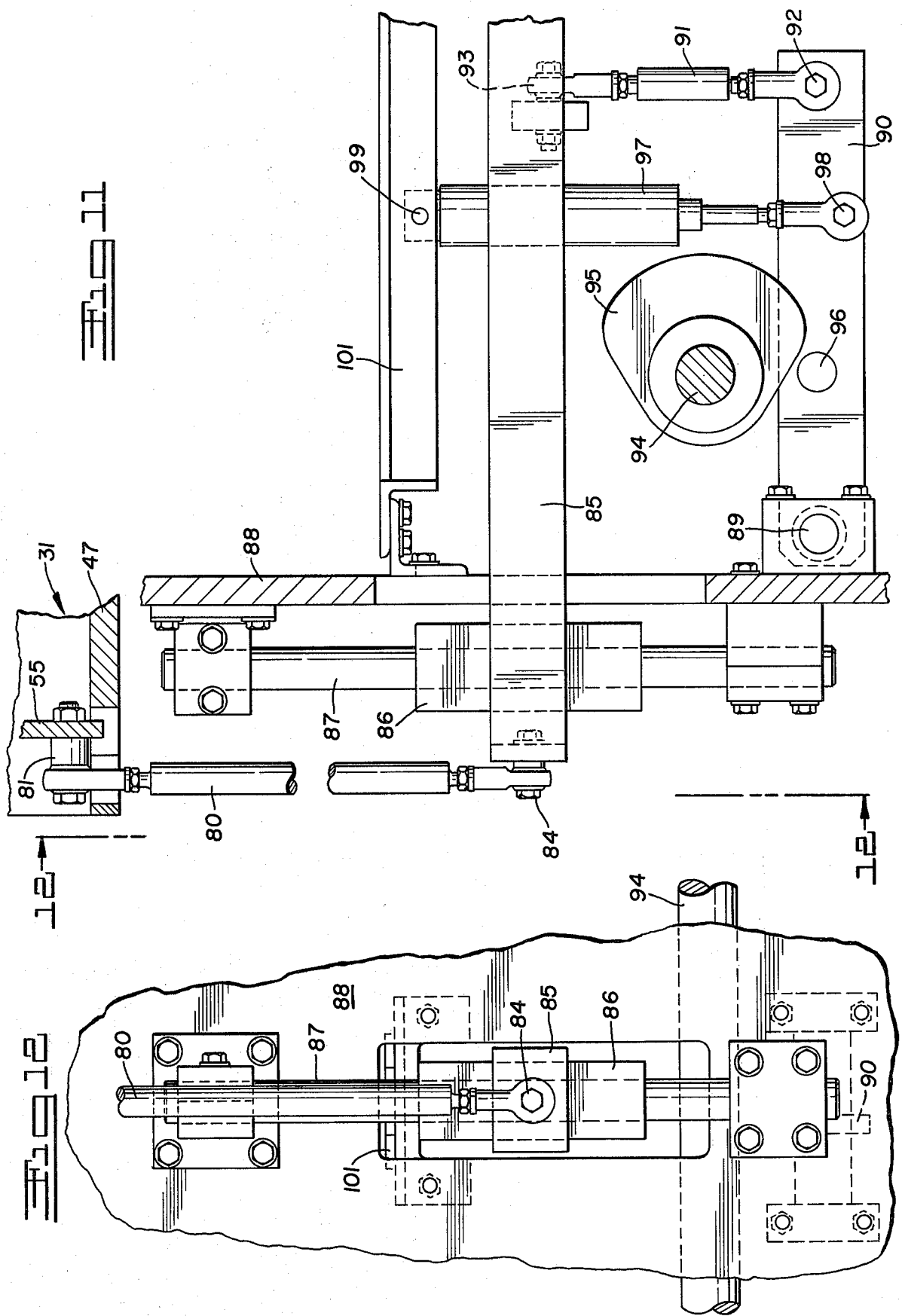

FEEDER FOR SLEEVE-ENCLOSED EDIBLE CONES

BACKGROUND OF THE INVENTION

The present invention will be described as being particularly applicable to a machine which receives a series of double-cone assemblies consisting of edible cones inserted in protective paper cones or sleeves, fills the sleeve-enclosed cones with ice cream, applies syrup to the tops of the ice cream, deposits nuts on the syrup-covered tops, and seals the open-mouths or upper ends of the paper cones or sleeves with individual caps supplied and formed from a roll of joined paper caps in strip form. The operations of producing the edible cone articles are similar to those described in the U.S. Pat. to Wise, No. 2,934,872 dated May 3, 1960 and the capped package is similar to the disclosed in the U.S. Pat. to Wise No. 2,965,499 dated Dec. 20, 1960. However, the first patent discloses a machine of the rotary turret type wherein successive sleeve-enclosed cone assemblies are fed to successive stations for the filling, treating and capping operations. The feeder unit of the present invention is applied to a straight-line machine which receives the sleeve-enclosed cone assemblies and forms them into transverse successive rows to be filled, treated and capped, each row containing a selected number of sleeve-enclosed cone assemblies.

SUMMARY OF THE INVENTION

The unit of the present invention provides a series of magazines for receiving stacks of the sleeve-enclosed cone assemblies and feeding them successively into a row of sockets on an underlying conveyor. The feeding is accomplished with a lower set of jaws which receive and support the lowermost of the sleeve-enclosed cone assemblies of the stacks, when closed, an upper set of jaws which receive and support one or more of the next higher sleeve-enclosed cone assemblies when closed, and vertically movable stripper fingers which engage the lowermost sleeve-enclosed cone assemblies adjacent the opened upper jaws, as they are released from the lower jaws, to ensure separation from the stacks and will also engage any of the edible cones of the lowermost assemblies if it adheres to the next higher sleeve in a stack. This ensures that complete sleeve-enclosed cone assemblies will be dropped into the upwardly opening row of sockets of the conveyor which will be positioned therebeneath.

BRIEF DESCRIPTION OF THE DRAWINGS

The best mode contemplated in carrying out this invention is illustrated in the accompanying drawings in which:

FIG. 11 is an elevational view of part of the feeder actuating cam mechanism.

FIG. 12 is an end elevational view taken from the position indicated at line 12—12 of FIG. 11.

DETAILED DESCRIPTION OF THE INVENTION

Figure 8:
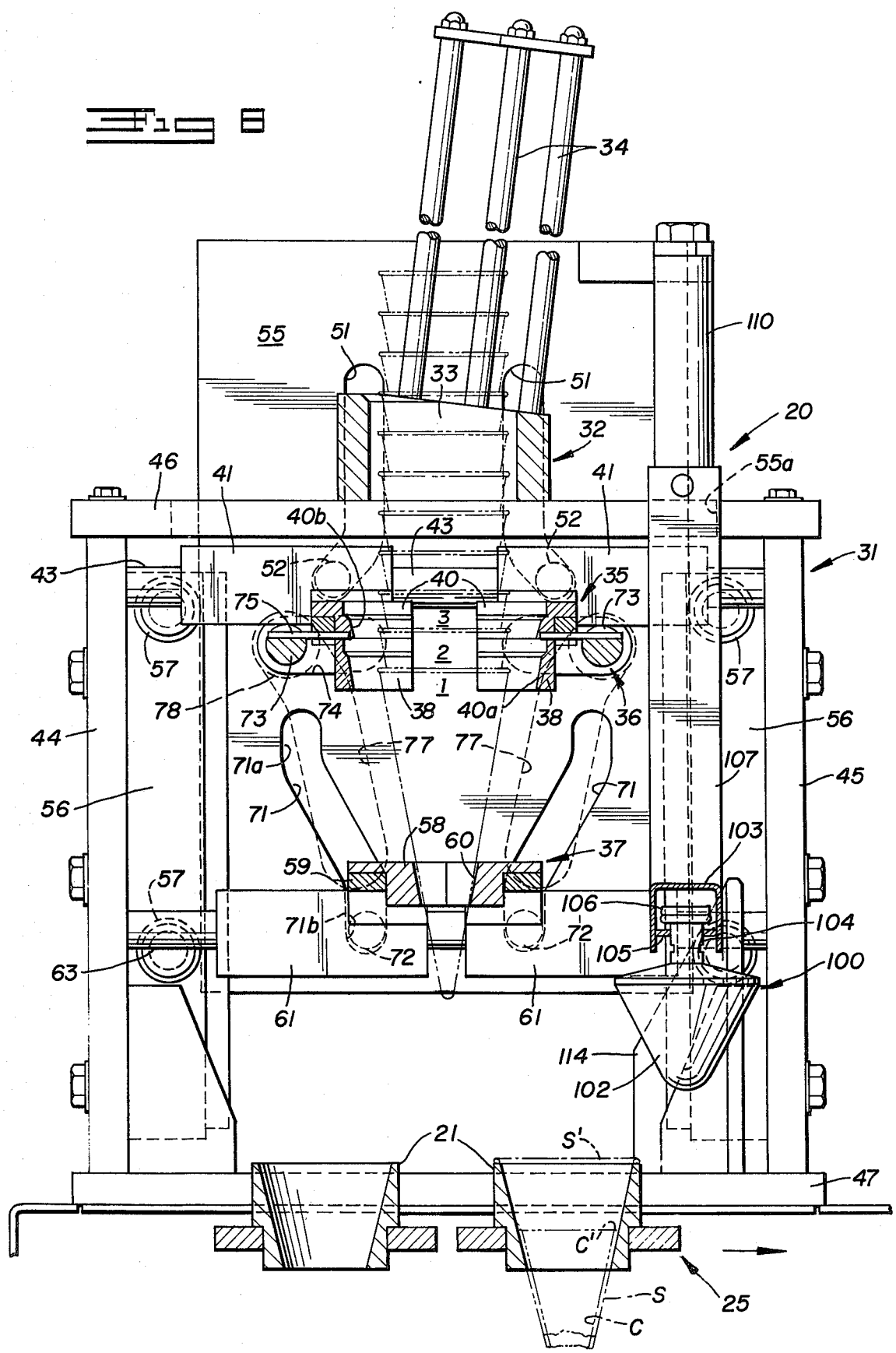
FIG. 8 is a vertical sectional view taken along line 8—8 of FIG. 3.
Figure 9:
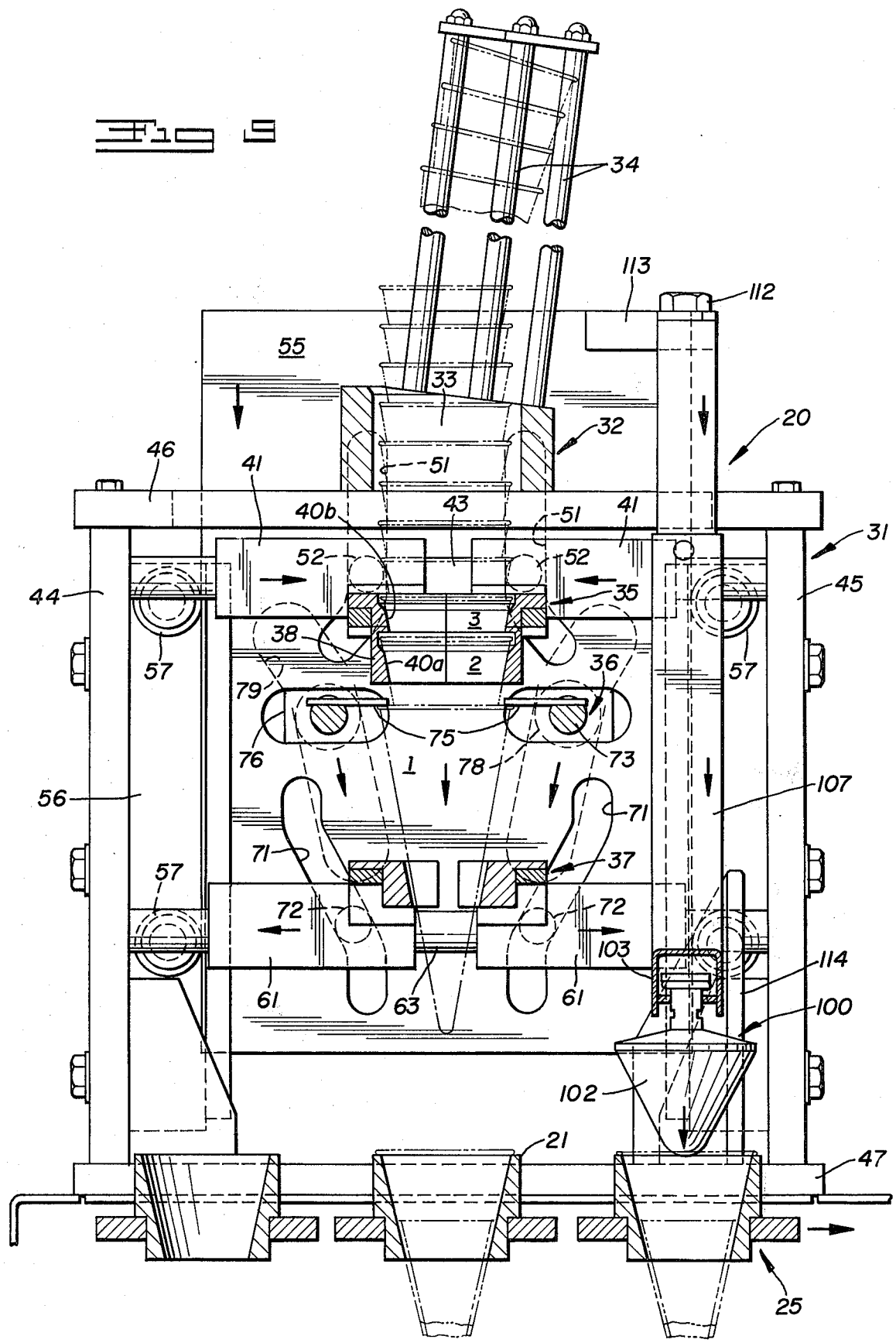
FIG. 9 is a similar view but showing parts in a different feeding position.
Figure 10:
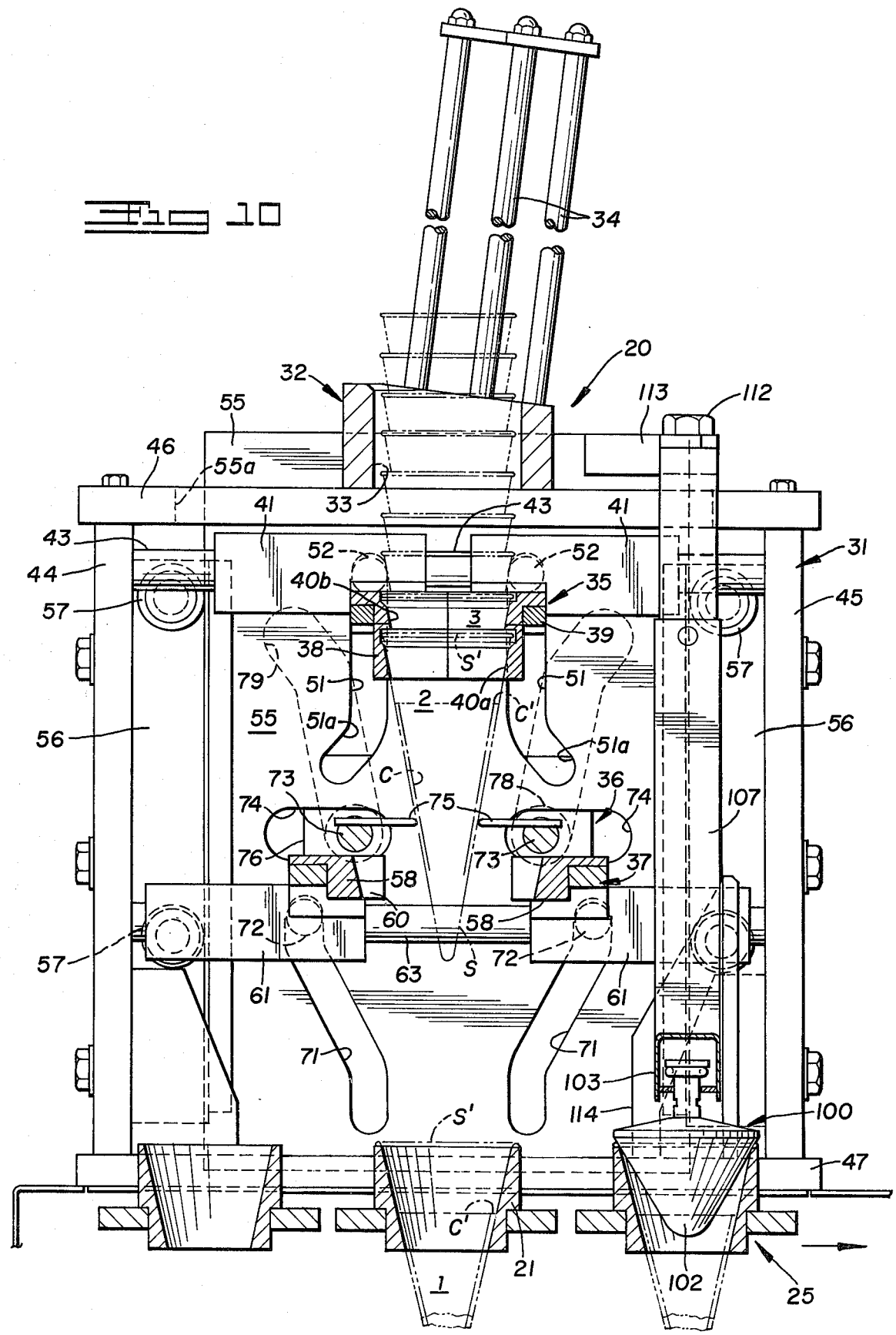
FIG. 10 is another similar view showing parts in still another different feeding position.

With particular reference to the drawings, the unit of this invention is indicated generally by the numeral 20 and is shown in cooperative relationship with a conveyor 25 which may be of any suitable type designed to bring therebeneath successive transverse rows of upwardly-opening cone-receiving cups or sockets 21 which are carried at longitudinally spaced intervals on the upper run of the conveyor. The conveyor is indicated as an endless chain type but may be a belt or other suitable type, intermittently moved to bring the rows of sockets 21 successively into cooperation with the unit 20. Each row of sockets or cups 21 may be in any suitable number but in the example shown, each row consists of six sockets for receiving that number of cones. The cones, after leaving the unit 20, are adapted to be filled with ice cream or similar substance as they are moved by the conveyor in the manner described in U.S. Pat. No. 2,934,872. The unit 20 of this invention will effectively form a row of cones and drop them into an aligning row of sockets 21 on the conveyor 25. As indicated in FIGS. 8 to 10, each of the cone assemblies supplied to this machine consists of an edible cone C enclosed within a protective outer cone or sleeve S, of paper or other suitable material. The upper edge of mouth $C^1$ of the cone C is spaced downwardly substantially from the upper edge or mouth $S^1$ of the sleeve S.

The unit 20 will be at the loading end of the conveyor 25 and will be supported by the side frame members 30 (FIG. 1) of the machine proper. The unit will include the opposed standards 31 upstanding from the respective frame members 30. These standards carry at their upper ends a transversely extending stacker 32. This stacker 32 has a series of cone assembly guide passages 33 extending vertically therethrough, the number depending on the number of sockets 21 in a transverse row on the conveyor 25, six being provided in the example shown. The passages 33 are properly spaced so that they are co-axial with the respective sockets 21 in the row moved into cooperation with the unit 20. Each of the passages 33 has arranged around it and upstanding from the stacker 32 magazine-forming rods 34. The magazines provided by the rods 34 will receive the sleeve-enclosed cone assemblies which are supplied in stacks of nested cone assemblies. These tend to wedge together and effective means must be provided in the unit 20 to separate the nested cone assemblies and supply them to all the sockets 21 in a row simultaneously as complete cone assemblies each including a cone C enclosed within a protective sleeve S. It will be apparent that the stacker 32 (FIGS. 1, 3, 6 and 8 to 10) is at a level substantially higher than the level of the upper run of the conveyor 25, and that each of the guide passages 33 is of suitable diameter to permit the cone assemblies to pass downwardly therethrough without interference.

For feeding the successive cone assemblies from the stacker 32 to the conveyor 25 as a complete row, there are provided below the stacker at successively lower levels (FIG. 3), an upper jaw assembly 35, an intermediate stripper assembly 36, and a lower jaw assembly 37. The assemblies 35 and 37 are at fixed levels and the assembly 36 is movable vertically therebetween during the stripping action.

Figure 1:
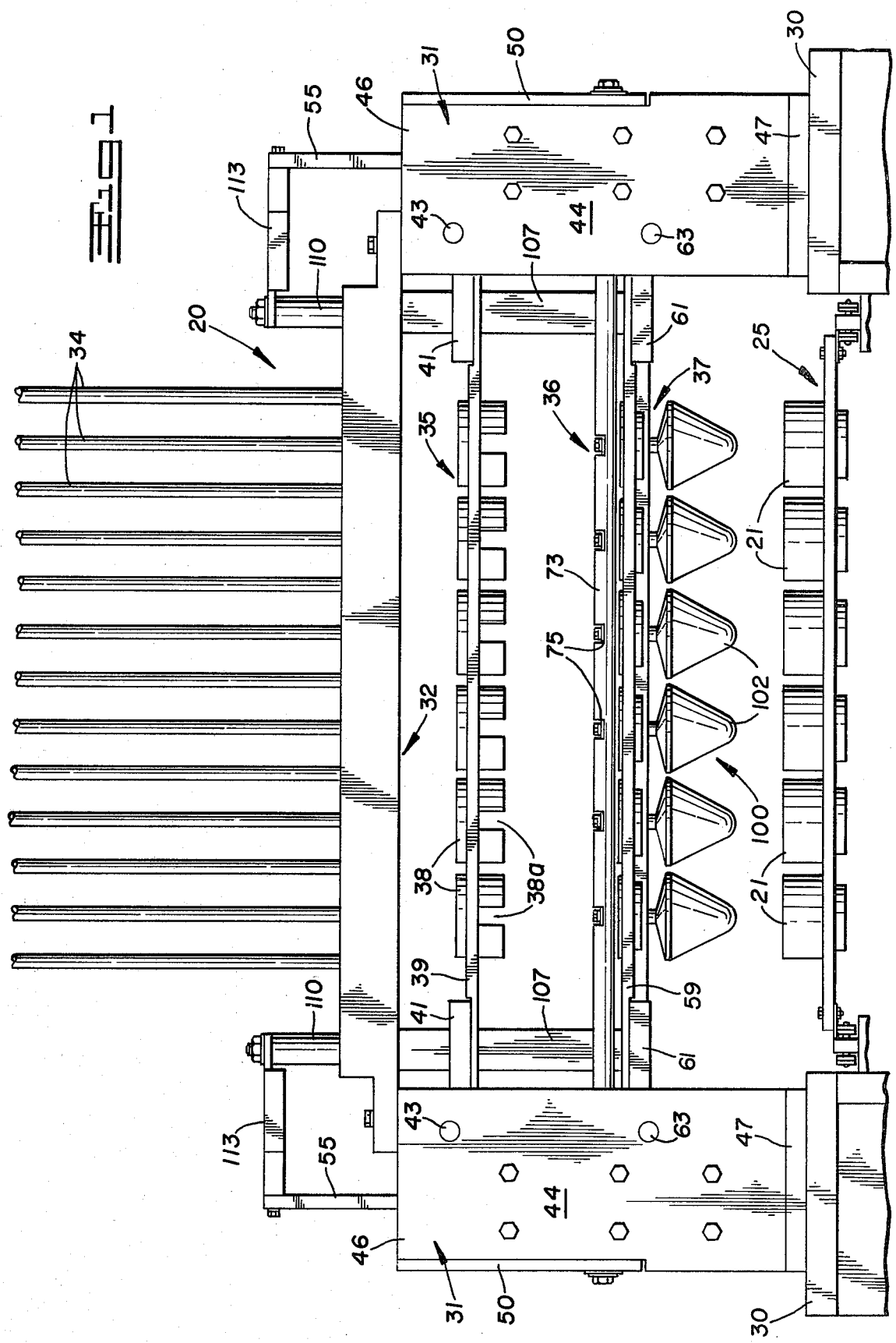
FIG. 1 is an end elevational view illustrating the portion of a machine which includes the unit of this invention for feeding the cone assemblies.
Figure 2:
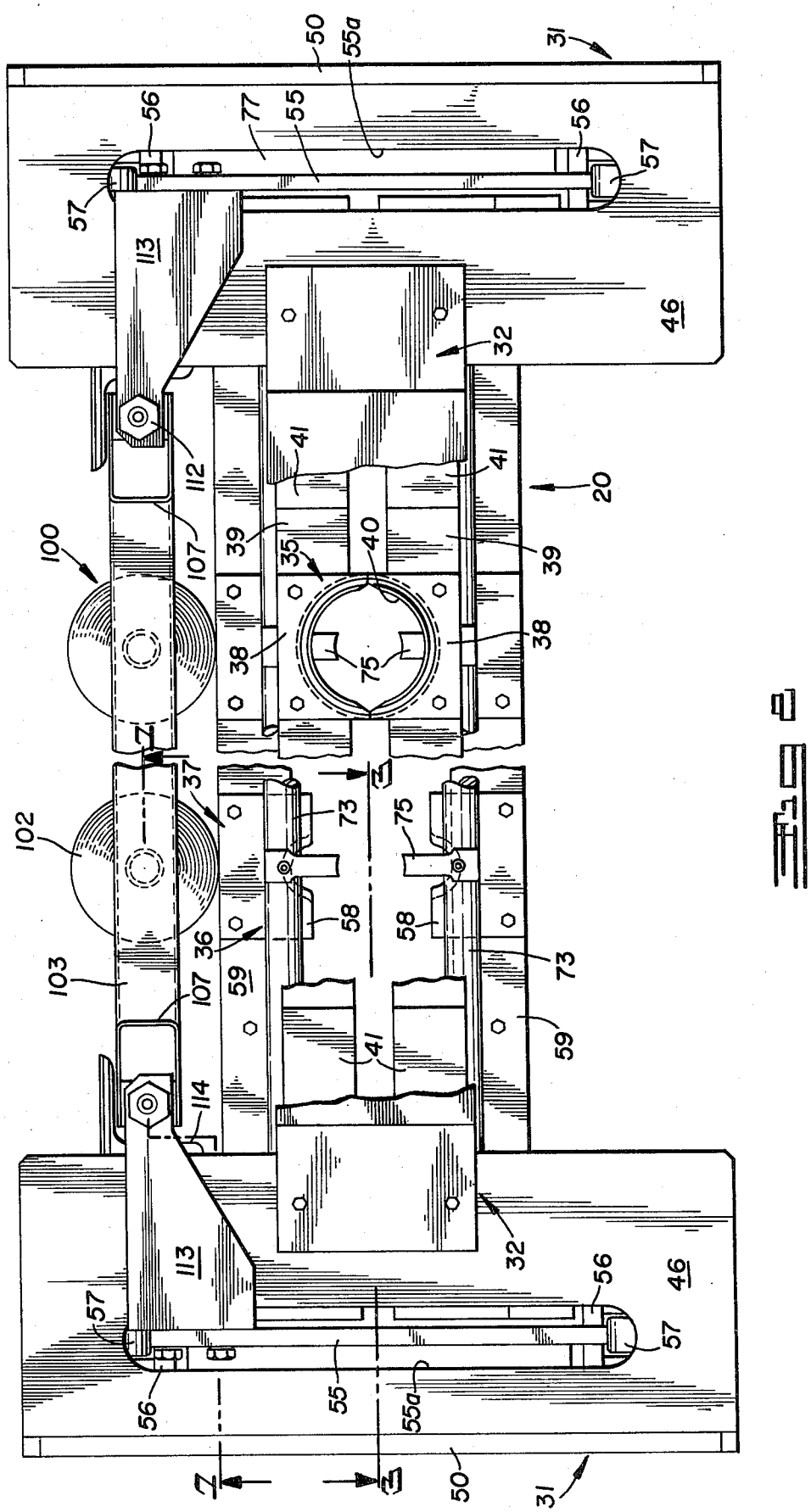
FIG. 2 is a plan view, partly broken away, of the unit of this invention.
Figure 3:
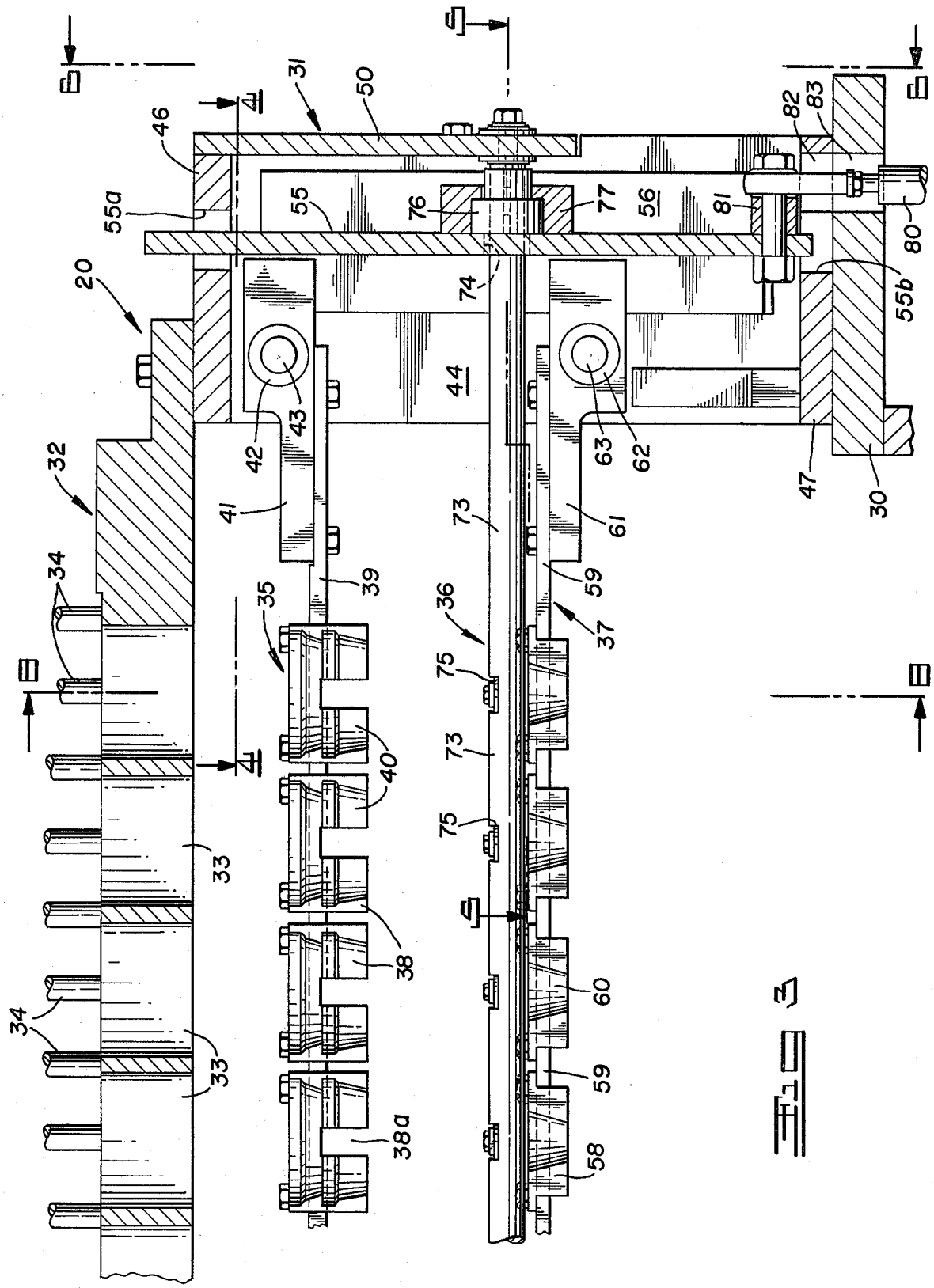
FIG. 3 is an enlarged vertical sectional view taken along line 3—3 of FIG. 2.
Figure 4:
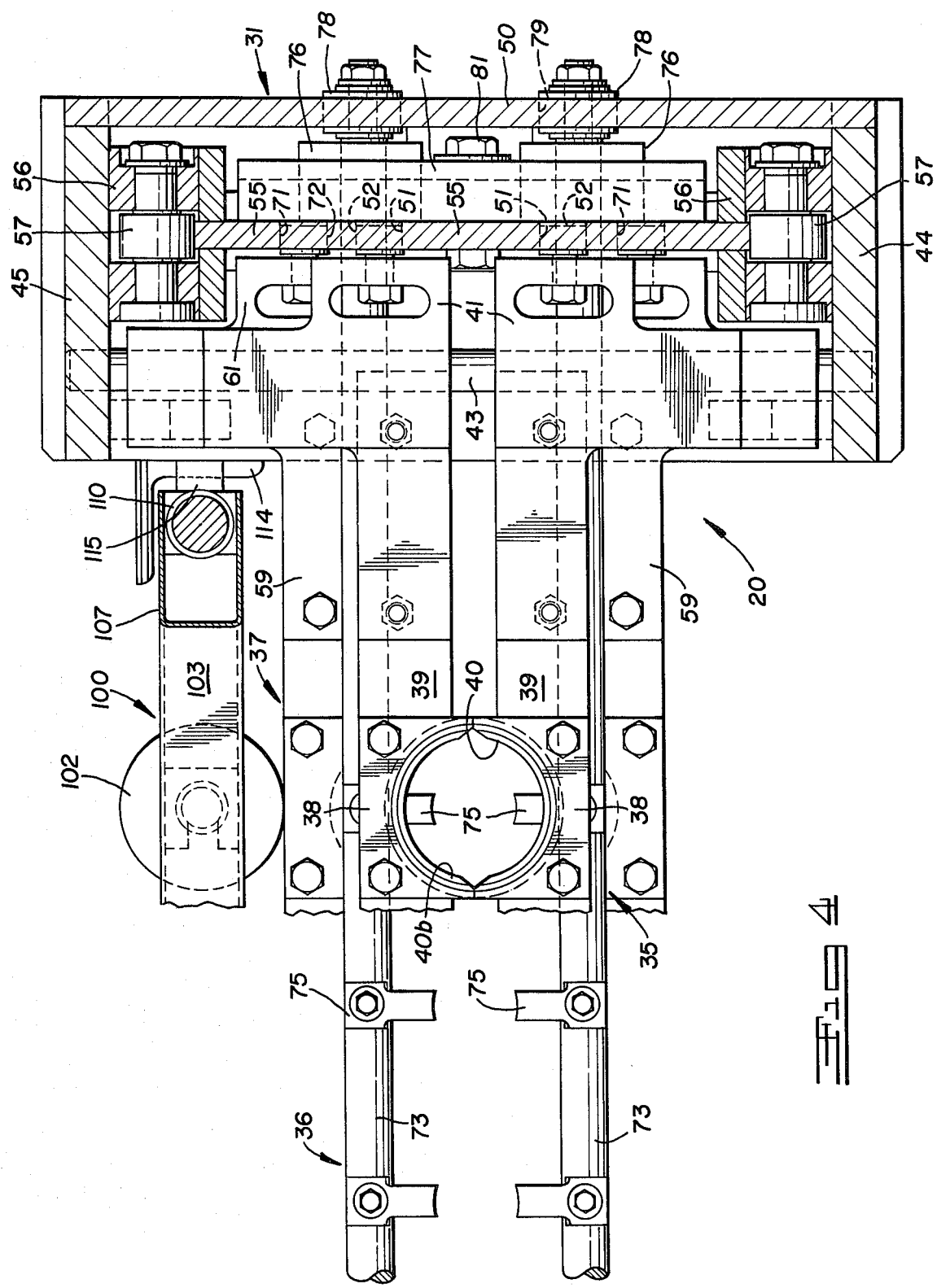
FIG. 4 is a horizontal sectional view, partly broken away, taken along line 4—4 of FIG. 3.

The upper jaw assembly consists of pairs of opposed jaw halves 38 which are bolted to horizontally and transversely extending mounting bars 39 (FIGS. 1, 2 and 3). The bars 39 are parallel and in the same plane and are movable towards and from each other. Each jaw half 38 forms half a socket 40 for engaging and gripping the upper ends of the cone sleeves when the opposed cooperating jaws of the pairs are brought together (FIG. 2) by proper movement of the bars 39. The jaws are so formed that each of the sockets 40 will engage and grip two of the cone assemblies near the lower end of the respective stacks. This will be evident from FIGS. 8 to 10, wherein a tapered support surface 40a is formed at a lower level and a tapered support surface 40b is formed at an upper level so that two of the cone sleeves S are gripped at their mouths. It is preferred to grip two sleeves due to the relatively fragile nature of the sleeves. In the example shown, the sleeves S have beads formed around their mouths and the adjacent surfaces of the sockets are formed to accommodate these beads but in some packages the beads will not be on the sleeves but the tapering or frusto-conical surfaces 40a and 40b will be sufficient to support the conical sleeves S. Each of the jaws 38 is provided with a vertical notch 38a in its side which opens downwardly and extends upwardly substantially half the height of the jaw. These will provide diametrically opposed stripper finger-receiving notches for each socket 40.

As indicated, the upper jaw-support bars 39 are supported for movement in a horizontal plane towards and from each other. Each bar is carried by a mounting bracket 41 at each of its ends. Each bracket 41 is provided with a bearing 42 for slidably mounting it on a support and guide rod 43. Each rod 43 extends horizontally forward and rearwardly in the upper end of a respective standard 31 being carried adjacent the upper ends of the upright forward and rearward transverse plates 44 and 45, which support a horizontal top plate 46 (FIGS. 8 to 10). The plates 46 carry the stacker 32, previously mentioned. A cam plate 50 is secured to each standard 31 at the outer side thereof in a fixed upright position in contact with the outer edges of the plates 44, 45 and 46. These plates along with a lower support plate 47 form each standard 31.

Thus, the guide rods 43 are supported adjacent the upper ends of the side standards 31 and the brackets 41 are slidably mounted in pairs thereon so that the brackets of each pair can be moved horizontally towards and from each other to thereby correspondingly move the jaw support bars 35 and the pairs of jaws 38 carried thereby, into cone assembly gripping and releasing positions. This movement is accomplished by means of an upright cam plate 55 which is mounted in each standard 31 for vertical reciprocal movement. Each cam plate 55 has a pair of vertical substantially parallel cam slots 51 close to its upper end (FIG. 6) which respectively receive cam followers 52 that are carried at the outer sides of the brackets 41. It will be noted that the lower ends of the cam slots 51 are laterally offset at 51a to provide diverging portions to produce the necessary horizontal movements of the slides 41.

Each of the cams 55 is mounted for vertical movement in its respective standard 31 by means of a pair of opposed upright guideways 56 (FIGS. 2 to 7) provided at the inner surfaces of the respective plates 44 and 45. These guideways have mounted therein roller units 57 which engage the opposed edges of the cam plate 55. It will be noted that the upper end of each cam plate 55 extends through a slot 55a in the respective top plate 46 and a similar slot 55b is provided in the lower plate 47 for receiving the lower end of the cam plate.

As previously indicated the lower cone assembly gripping jaw assembly 37 is at a lower level and it consists of a pair of transversely extending mounting bars 59 (FIGS. 1, 2 and 3 to 5), which carry the jaws as opposed jaw halves 58 which are bolted to the bars. The bars 59 are similar to the bars 39 of the upper jaw assembly 35 and are similarly mounted in parallel relationship in the same plane and are movable towards and from each other. Each jaw half 58 forms half a socket 60 of frusto-conical form for engaging and gripping the cone-sleeve S towards their lower ends when the opposed cooperating jaws of the pairs are brought together (FIG. 3) by proper movement of the bars 59.

As indicated, the lower jaw support bars 59 are supported for movement in a horizontal plane towards and from each other. Each bar is carried by the brackets 61 at its opposed ends by means of bearings 62, which are slidably mounted on the guide rods 63 provided on the respective side standards 31. Each guide rod 63 extends horizontally forwardly and rearwardly on the standard below rods 43, being secured by the forward and rearward transverse plates 44 and 45. It will be noted (FIG. 3) that in each standard the rods 43 and 63 are in a common vertical plane.

Figure 5:
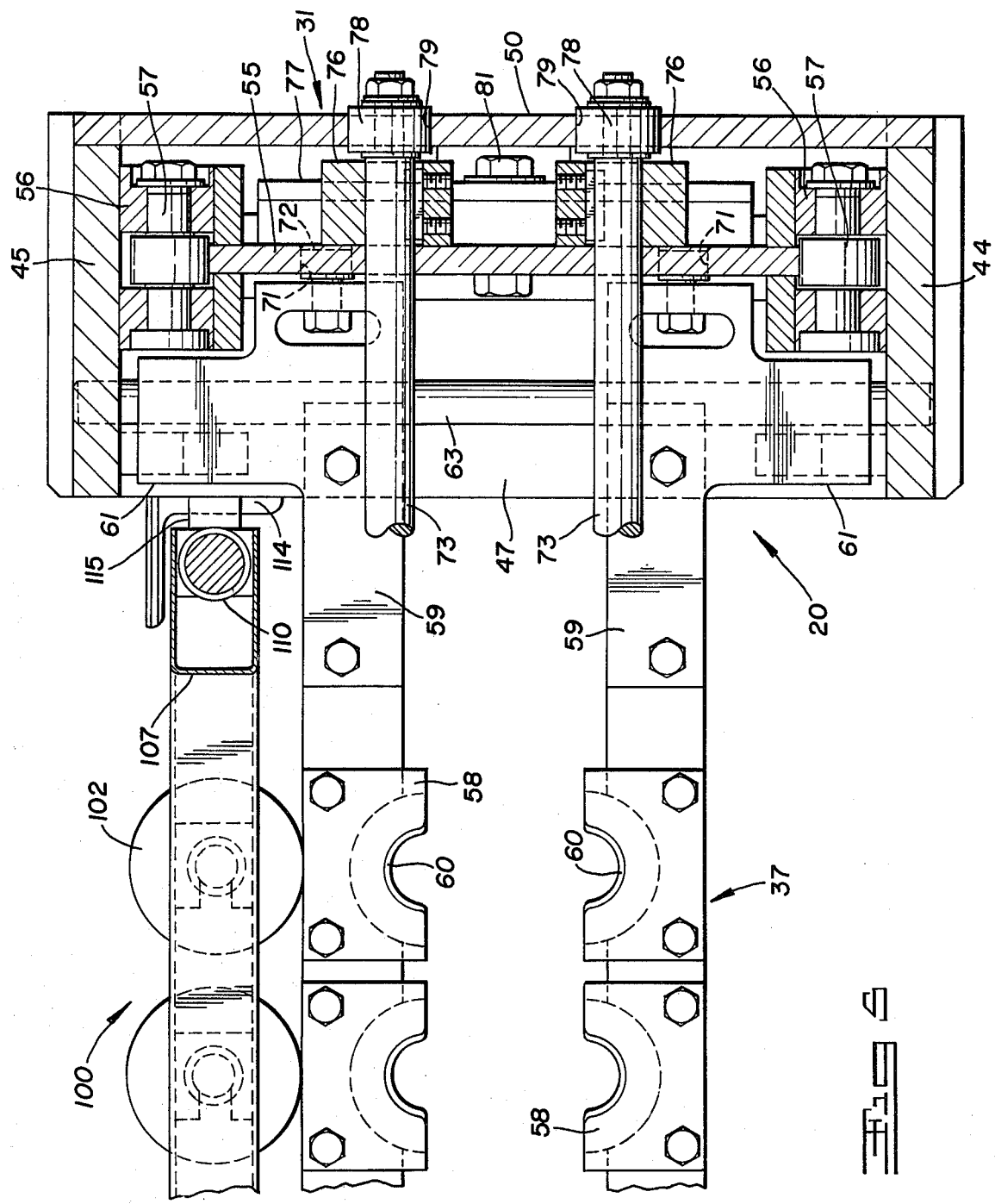
FIG. 5 is a horizontal sectional view taken along line 5—5 of FIG. 3.

Thus, the brackets 61 are mounted on the rods 63 in pairs and can be moved horizontally towards and from each other to thereby correspondingly move jaw support bars 59, and the pairs of jaws 58 carried thereby, into cone-assembly gripping and releasing positions. This movement is accomplished by the vertically reciprocable cam plates 55, previously mentioned, and is in timed relationship to the movement of the upper jaw assembly 35. For this purpose, each cam plate 55 is provided with a pair of cam slots 71 (FIG. 6), similar to the previously mentioned cam slots 51, and disposed in the lower portion of the cam plate. These cam slots 71 respectively receive cam followers 72 that are carried at the outer sides of the brackets 61 (FIG. 5). It will be noted that the slots 71 of each pair converge downwardly to produce the necessary horizontal movements of the slides 61, and are provided with vertical upper ends 71a and vertical lower ends 71b.

As previously indicated, the stripper assembly 36 is mounted intermediate the upper and lower jaw assemblies 35 and 37. It comprises (FIGS. 1 and 3) a pair of transversely extending mounting rods 73 which are disposed in a common horizontal plane for movement towards and from each other but are also movable vertically as a pair so as to remain in a common horizontal plane. The rods 73 carry the stripper fingers 75, arranged on the rods to provide cooperating pairs in which the fingers extend inwardly towards each other. The rods 73 have their opposite ends extending into the standards 31 where they are supported for vertical movement by the respective cam plates 55. It will be noted (FIGS. 3, and 4 to 6) that the rods 73 have their ends extending through horizontal slots 74 in the respective cam plates 55 and outwardly of the cam plates carry guides 76 which operate in horizontal guide channels 77 carried by the outer faces of the respective cam plates. The rods 73 extend farther outwardly through the fixed cam plates 50 which are outwardly of and parallel to the respective cam plates 55. The outer ends of the rods 73 carry cam followers 78 which operate in slots 79 formed in the cam plates 50. The slots 79 are arranged in downwardly converging relationship to produce the necessary horizontal movement of the rods 73 towards and from each other during their vertical movement produced by vertical movement of the cams 55 which carry them. The horizontal movements of the rods 73 will be confined in a single horizontal plane by the guides 77 but the level of this plane will vary in accordance with vertical movement of the cams 55 relative to the fixed cam 50. These movements of the rods 73 will produce the desired movements of the fingers 75 carried thereby, causing the opposed fingers of each pair to move towards and from each other and to different levels. These movements will be in timed relationship to the movements of the upper jaw assembly 35 and the lower jaw assembly 37, due to the relative movement of cams 55 and 50 and the shape and relationship of the cam slots 51, 71 and 79 formed therein.

The cams 55 are moved vertically in timed relationship to the movement of the conveyor 25 by means of vertically extending actuating rods 80 (FIGS. 3, 6 and 11) which have their upper ends pivoted at 81 to the lower ends of the respective cams 55. The rods extend downwardly through aligning openings 82 and 83, in the respective plates 47 and 30, into the base of the machine, where each is pivoted at 84 to the outer end of an actuating bar 85, which is mounted for vertical reciprocable movement by sleeves 86 sliding on vertical rods 87 secured to a support plate 88 of the machine base. The actuating bar 85 is moved vertically by means of a lever 90 which is pivoted at 89 to one of the plates 88, for vertical swinging movement, and which is connected to the bar 85 by a connecting rod 91, pivoted at its lower end at 92 to the lever 90 and at its upper end to the bar 85 by a universal pivot 93. Thus, vertical swinging movement of the lever 90 will result in vertical travel of the bar 85 which will, in turn produce vertical movement of both cams 55. The lever 90 is swung vertically intermittently by means of a cam 95 keyed to a shaft 94 driven by the same drive that drives the conveyor 25. This cam normally engages a cam follower 96 on the lever 90 but at times it may be desirable to move this cam follower to a lower position where the cam cannot engage it. This can be accomplished, when the unit 20 is to be inoperative, by means of a cylinder and piston unit 97 connected pivotally to the lever 90 at 98, at its lower end, and at its upper end, at 99 to a fixed support 101. However, normally when the unit 20 is in operation, the cylinder and piston unit 97 will bias the follower 96 against the edge of the cam 95.

Figure 7:
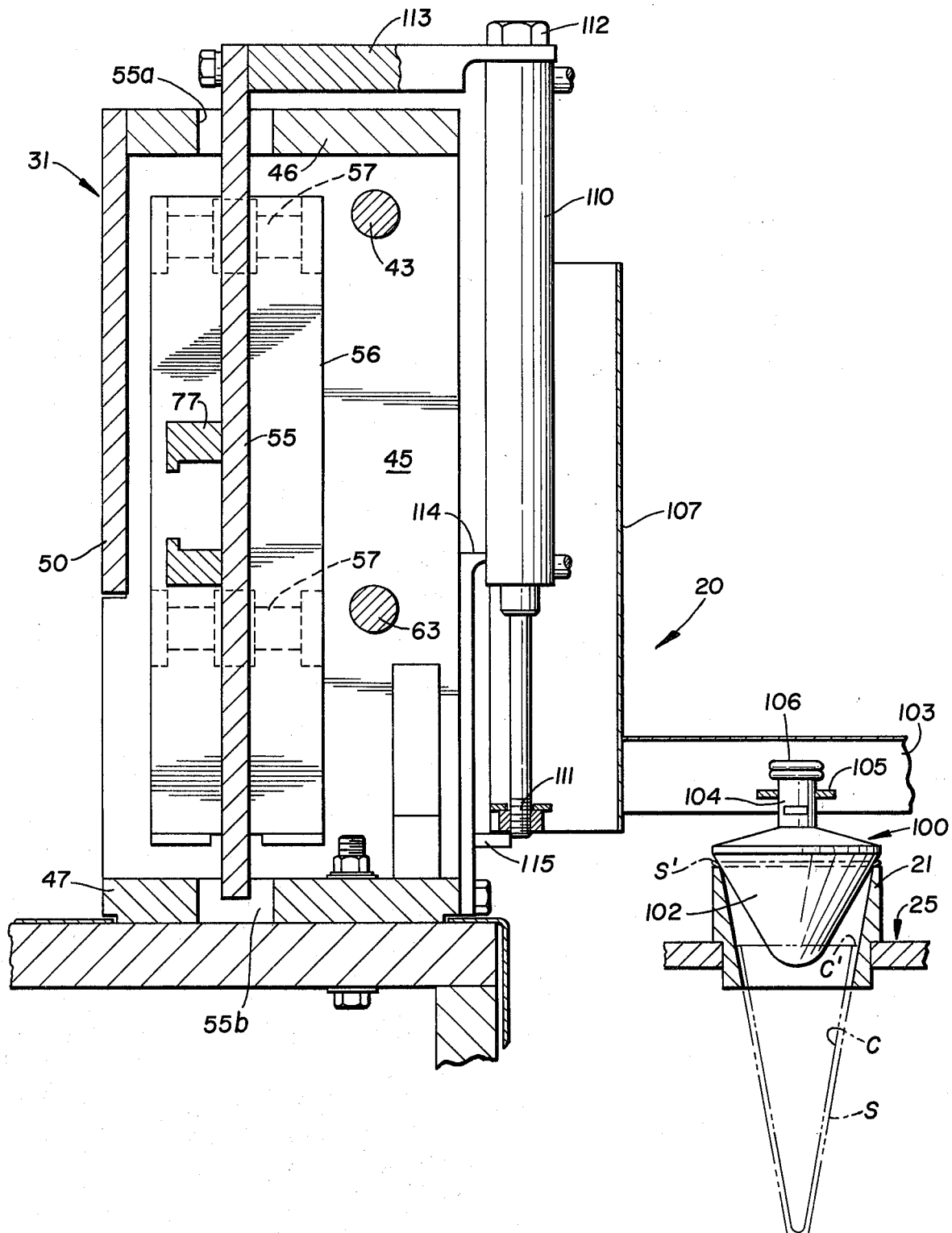
FIG. 7 is an enlarged vertical sectional view taken along line 7—7 of FIG. 2.

After the row of cone assemblies is deposited in the upwardly opening sockets 21 of the conveyor 25, it may be desirable to reform the mouths $S^1$ of the flexible sleeves S into exact annular condition so as to facilitate the subsequent capping and sealing operations. This is accomplished with a forming unit 100 (FIGS. 1, 2, 7 and 8 to 10). This unit comprises a row of forming plugs 102 which are adapted to be inserted in a row of the upwardly-opening sockets 21 after the cone assemblies have been dropped thereinto (FIG. 7). The plugs 102 are of conical shape and of proper size to engage the mouths $S^1$ of the sleeves S and press the material outwardly into engagement with the annular upper edge of the sockets 21. This will restore the annular form of the upper edges or mouths $S^1$ of the conical sleeves S.

The weight alone of the forming plugs 102 is relied upon for the reformation and, consequently, the heads are carried for limited vertical movement by a transverse downwardly turned support channel 103. Each head is provided with an upstanding stem which passes loosely through a guide opening in a cleat 105 fixed within the channel 103, a stop flange 106 being provided at the upper end of the stem to limit downward sliding movement.

The ends of the transverse support channel 103 are fixed to vertical supports 107 (FIG. 7) which are in the form of outwardly-opening, channels that straddle the lower portions of the vertically disposed cylinder and piston units 110. The units 110 have their piston rods fixed to the members 107 by connections 111 at their lower ends and have their cylinders rigidly connected at 112 to horizontal plates 113 extending outwardly over the top plates 46 of the standards 31. The outer edges of these plates are rigidly bolted to the upper edges of the respective cam plates 55.

It will be apparent that vertical movement of the cam plates 55 will produce vertical movement of the support channel 103 through the connections including plates 113, units 110, and channels 107. This will produce vertical movement of the row of plugs 102 in timed relationship with the conveyor 25. The reason for providing the cylinders and piston units 110 in the connections is so that the plugs 102 can be moved to an inoperative level when they are not to be used. This will be accomplished by controlling the fluid supply to the units 110 to retract the piston rods thereof. Stops 114 (FIGS. 2, 4, 5 and 7 to 10) are provided at the inner sides of the standards 31, and are in the form of upstanding angles which are fastened in place and have inwardly extending flanges 115 that serve as stop guides to engage the members 107, for limiting movement of the members 107 and the support channel 103 carried thereby in the direction of advance of the conveyor, as support 103 moves vertically in moving the flanges 102 in and out of the sockets 21. The members 103 can slide against the stops 104 during the vertical movements of such members.

In the operation of the feeder unit 20, the various stacks of cone assemblies are inserted so that they drop down through the various guide passages 33 of the stacker 32. The sleeves S of the successive cone assemblies of each stack to be referred to in the description of the operation are designated 1, 2 and 3 in FIG. 13. At this time, the upper sockets 40 will be open, the lower jaws 58 will be closed, and the strippers 75 will be spread and in their uppermost position, as indicated in FIG. 8, this being brought about by movement of the cam plates 55 to their uppermost position. Each stack of cone assemblies will thus be supported by a pair of lowermost jaws 37, the socket 60 thereof receiving and engaging the lowermost sleeve 1. At this time, the stripper fingers 75 are at a level just above sleeve 2 and extend into the notches 38a of jaws 38.

Figure 6:
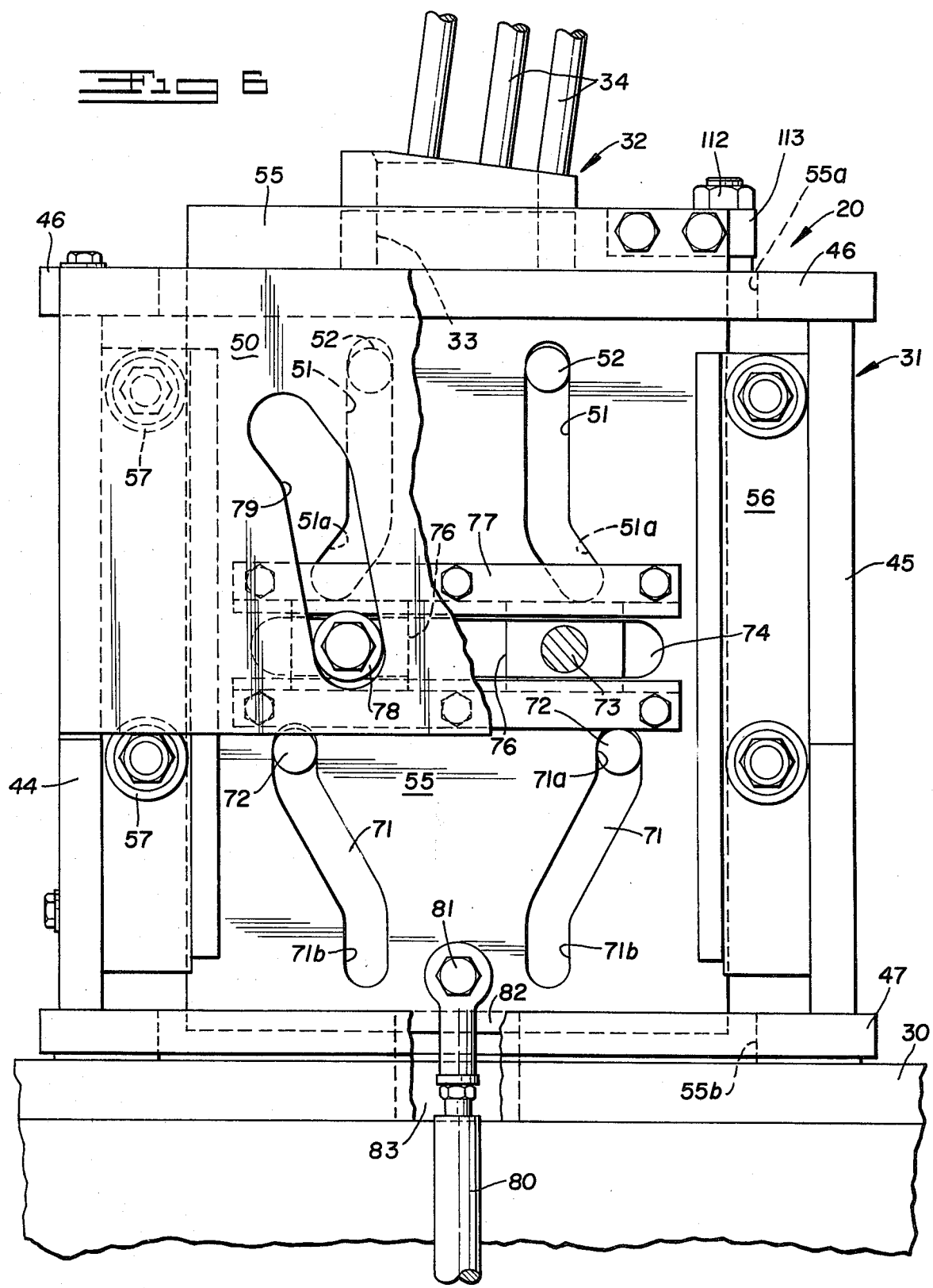
FIG. 6 is a side elevational view taken from the position indicated by line 6—6 of FIG. 3.
Figure 13:
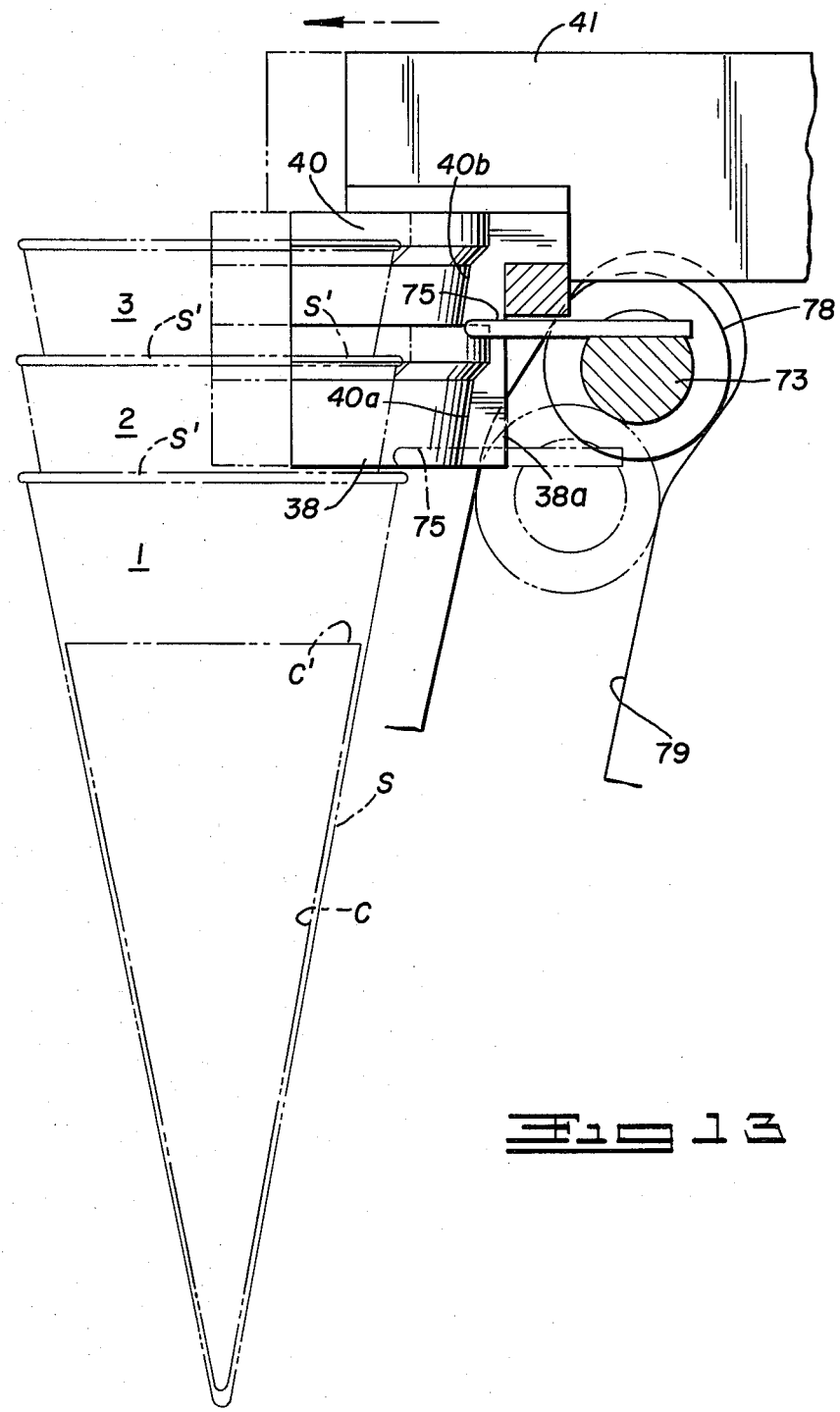
FIG. 13 is a schematic view illustrating the action of the stripper.

The row of cone-receiving sockets 21 on the conveyor will move into position to receive the row of cone assemblies, as the cam plates 55 are now moved downwardly to feed the coneassemblies downwardly, the cam plates eventually reaching their lowermost position indicated in FIG. 6. As the cam plates 55 start to move downwardly, in the manner indicated in FIG. 9, the lower jaws 58 start to open, the upper jaws 38 start to close and the stripper fingers 75 start to move inwardly and downwardly. On continued downward movement of the cams 55, the upper jaws 38 will completely close, as indicated in FIG. 10, to engage and grip cone sleeves 2 and 3, to prevent any further feed from the stack. This occurs before the lower jaws 58 have opened sufficiently to release sleeve 1. Also, at this time, the strippers 75 will be in their lowermost positions and will have approached each other as much as possible. The movement of the inner ends of the stripper fngers 75 substantially follow the angle of sleeve 2. The movement and actions of the stripper fingers are indicated in FIG. 13. During vertical downward movement of the cams 55, the fingers 75 first move inwardly and downwardly through the slots 38a until they engage the upper lips $S^1$ of sleeve number 1. Upon further downward movement of the cams 75 the fingers will push sleeve 1 downwardly, stripping sleeve 1 from sleeve 2. It will be noted that cam slots 79 are substantially parallel to the sleeve angle and even after sleeve 1 is engaged, the inner extremities of the fingers 75 closely follow the angle of sleeve 2. Ordinarily sleeve 1, and its contained cone C, will be stripped from the sleeve 2. However, in some instances the cone C of sleeve 1 will adhere to the exterior of sleeve 2. In such an instance, however, the cone will be stripped from the sleeve 2, by the fingers 75, which have engaged sleeve 1 and stripped it from 2, eventually moving inwardly close enough to the exterior of sleeve 2 to strip the cone therefrom by engaging its lip $C^1$ and cause it to drop into sleeve 1 before the lower jaws 58 have closed. This will ensure that a complete cone assembly will be dropped into the respective receiving socket 21. Thus, the cone assemblies 1 are stripped from the lower ends of the stacks and the stripper is such that it ensures that the sockets 21 will receive and support complete assemblies. During the latter part of the downward movements of the cams 55, the lower jaws 58 open and all the cone assemblies supported thereby are deposited as a complete row in the row of conveyor sockets which has been moved into receiving position. At about the same time, the formers 102 enter into the sleeves S of the previously deposited row of coneassemblies to reshape the mouths $S^1$ thereof. As indicated, vertical movements of the cams 55 are controlled by the rotatable cam 95 in cooperation with the follower 96 on lever 90. Vertical movements of the cam plates 55 will be under the control of the rotatable cam 95 and the follower 96 on the lever 90 which as indicated will be held against the cam by the cylinder and piston unit 97. Upward movement of the cams 55 will close the lower jaws 58, open the upper jaws 38 and move the stripper fingers 75 to their upper level and in spread condition, as indicated in FIG. 8, so that the sequence of operations described will be repeated.

It will be apparent that this invention provides a unit for effectively feeding a row of cone assemblies from stacks to a row of receiving sockets carried by a conveyor, thereby greatly increasing production. Although the unit of this invention has been described as being applied to a straight-line conveyor machine, it could be applied to a turret-type machine of the type disclosed in U.S. Pat. No. 2,934,872 if the turret is provided with radial rows of cone-receiving support sockets or cups. The unit of this invention not only effectively strips the cone assemblies successively from the lower ends of the stacks, but ensures that the protective sleeve, supplied to the conveyor socket, always has a cone therein. Of course, the unit could be used for feeding single cones rather than cone assemblies. Also, it can be used for feeding cone assemblies in which the protective sleeves are of material other than paper, such as foil, plastic, etc. The unit can also handle frusto-conical cups equally as well.

Having thus described the invention, what is claimed is:

1. Apparatus for feeding containers of conical or frusto-conical form successively from the lower end of a stack of the nested containers comprising:
   a stacker having a guide passage receiving and positioning a stack of the nested containers;
   an upper jaw assembly at one level below the stacker guide passage and comprising opposed container-engaging jaws on opposite sides of the positioned stack;
   a lower jaw assembly at a still lower level and at a predetermined distance below the first level and comprising container-engaging jaws on opposite sides of the positioned stack;
   means for supporting the lower jaws for movement in a first common horizontal plane towards and from each other, into and out of engagement with the lowermost container at the lower end of the stack, said means including lower support bars movable in a fixed plane towards and from each other and carrying a pair of cam followers;
   means for supporting the upper jaws for movement in a second common horizontal plane parallel to the first plane towards and from each other, into and out of engagement with the next higher container of the stack, said means including upper support bars movable horizontally in a fixed plane towards and from each other and carrying a pair of cam followers;
   an intermediate stripper assembly disposed between the upper and lower jaw assemblies comprising a pair of opposed stripper fingers on opposite sides of the stack extending inwards towards each other, means for supporting and guiding, the stripper fingers in a common horizontal plane for movement towards and from each other into and out of engagement with the said next higher container and for simultaneous vertical movement, said means including support rods mounted on horizontally reciporcable guides and carrying cam followers for composite movement both horizontally and vertically between said upper and lower support bars; and
   control means comprising upright fixed cam plates having pairs of cam grooves cooperatively engaging the cam followers on said stripper support rods, upright movable cam plates mounted for vertical reciprocation relative to said fixed cam plates and having respective pairs of cam grooves cooperatively engaging the cam followers of said support bars for said upper and lower jaws and carrying said horizontally reciprocable guides for said stripper support rods, and means for reciprocating said movable cam plates relative to said fixed cam plates for moving said lower jaw supporting means, said upper jaw supporting means and said stripper finger supporting means and said stripper finger supporting means to operate in the following sequence:
1. move the lower jaws horizontally inwardly into engagement with the lowermost container of the stack to support the stack;
2. move the upper jaws horizontally outwardly out of engagement with the next higher container of the stack to release the stack after support by the lower jaws;
3. move the stripper fingers vertically to an upper position adjacent the upper jaws and horizontally outwardly to positions on opposite sides of the upper jaws;
4. move the upper jaws horizontally inwardly into engagement with the next higher container of the stack to support the stack;
5. move the lower jaws horizontally outwardly to release the said lowermost container after the next higher container is engaged by the upper jaws; and
6. move the stripper fingers horizontally inwardly and vertically downwardly to engage the released lowermost container.

2. Apparatus according to claim 1 in which:
said upper jaws are provided with diametrically opposed downwardly-opening notches aligning with the opposed stripper fingers and into which the fingers project in their inward and downward movement into engagement with the lowermost container of the stack.

3. Apparatus according to claim 2 in which the containers have upwardly-opening mouths and inwardly tapering side walls and in which:
said upper jaws are formed to grip a plurality of the containers adjacent their mouths, and said lower jaws are formed to grip the tapering side walls of said containers.

4. Apparatus according to claim 2 in which the containers are assemblies in which each has an inner container disposed within an outer protective sleeve with its upper edge spaced below the upper edge of the sleeve;
said means for supporting the stripper fingers causing them to follow substantially the contour of the next higher container during their inward and downward movement through said notches to first engage the upper edge of the lowermost outer protective sleeve and then engage the upper edge of the container therein if it adheres to the exterior of the next higher protective sleeve.

5. Apparatus according to claim 1 in which:
the stacker comprises a plurality of laterally-spaced guide passages for receiving a plurality of stacks of the nested containers, each of said upper and lower jaw assemblies comprises a pair of opposed jaws for cooperating with each of the respective stacks, and
said stripper assembly comprises a pair of opposed fingers for cooperating with each of the respective stacks, and a movable conveyor provided below the lower jaw assemblies and carrying a plurality of upwardly-opening container-receiving sockets arranged in successive rows corresponding in number and lateral spacing to the spacing of said guide passages and the stacks positioned thereby, and said control means including means for advancing the conveyor in timed relationship to the means for moving the jaw and stripper finger supporting means to successively position the rows of container-receiving sockets below the lower jaw assemblies.

6. Apparatus according to claim 5 in which the containers have flexible upper edges and the sockets for receiving the containers are of complemental frusto-conical form to engage the upper edges of the containers exteriorially when they are positioned therein;
means for supporting above the conveyor a row of forming plugs corresponding in number and lateral spacing to the row of container-receiving sockets and insertable in the containers disposed therein to reform the flexible upper edges thereof,
said row of forming plugs being supported beyond the lower jaw assemblies in the direction of advance of the conveyor by said supporting means for downward movement into the row of supported containers, and said control means timing the advancing movement of the conveyor and the downward movement of the forming plugs in relationship to the means for moving said jaw supporting and stripper finger supporting means.

7. Apparatus according to claim 6 in which:
said means for supporing said forming plugs includes a support bar extending over the conveyor,
means for vertically reciprocating the bar relative to the conveyor, and
means for suspending the forming plugs from said bar for limited vertical movement upon contact of said plugs with the upper edges of the containers.

8. Apparatus according to claim 7 in which:
said means for vertically reciprocating the plug-supporting bar comprises connections between said bar and said vertically movable cam plates.

9. Apparatus according to claim 8 in which:
said connections include cylinder and piston units for suspending said plug-supporting bar which can be actuated to raise the support to a level where the plugs are inoperative even upon lowering of the cams.

10. Apparatus for feeding containers of conical or frusto-conical form successively from the lower end of a stack of the nested containers comprising:
a stacker having a plurality of laterally spaced guide passages for receiving and positioning a plurality of stacks of the nested containers;
an upper jaw assembly at one level below the stacker guide passages and comprising a pair of opposed container-engaging jaws on opposite sides of each of the positioned stacks;
a lower jaw assembly at a still lower level and at a predetermined distance below the first level and comprising a pair of container-engaging jaws on opposite sides of each of the positioned stacks;
means for supporting the lower jaws for movement in a first common horizontal plane towards and from each other, into and out of engagement with the lowermost container at the lower end of the stack, said means including lower support bars movable in a fixed plane towards and from each other and carrying a pair of cam followers;
means for supporting the upper jaws for movement in a second common horizontal plane parallel to the first plane towards and from each other, into and out of engagement with the next higher container of the stack, said means including upper support bars movable horizontally in a fixed plane towards and from each other and carrying a pair of cam followers;

an intermediate stripper assembly disposed between the upper and lower jaw assemblies comprising a pair of opposed stripper fingers on opposite sides of each of the stacks and extending inwardly towards each other, means for supporting and guiding the stripper fingers in a common horizontal plane for movement towards and from each other into and out of engagement with the said next higher container and for simultaneous vertical movement, said means including support rods mounted on horizontally reciprocable guides and carrying cam followers for composite movement both horizontally and vertically between said upper and lower support bars;

a movable conveyor provided below the lower jaw assemblies and carrying a plurality of upwardly-opening, container-receiving sockets arranged in successive rows corresponding in number and lateral spacing to the number and spacing of said guide passages and the stacks positioned thereby; and control means comprising upright fixed cam plates having pairs of cam grooves cooperatively engaging the cam followers on said stripper support rods, upright movable cam plates mounted for vertical reciprocation relative to said fixed cam plates and having respective pairs of cam grooves cooperatively engaging the cam followers of said support bars for said upper and lower jaws and carrying said horizontally reciprocable guides for said stripper support rods, and means for reciprocating said movable cam plates relative to said fixed cam plates for moving said lower jaw supporting means, said upper jaw supporting means and said stripper finger supporting means and advancing said conveyor in timed relationship to said jaw and stripper finger supporting means to operate in the following sequence:

1. move the lower jaws horizontally inwardly into engagement with the lowermost container of the stack to support stack;
2. move the upper jaws horizontally outwardly out of engagement with the next higher container of the stack to release the stack after support by the lower jaws;
3. move the stripper fingers vertically to an upper position adjacent the upper jaws and horizontally outwardly to positions on opposite sides of the upper jaws;
4. move the upper jaws horizontally inwardly into engagement with the next higher container of the stack to support the stack;
5. move the lower jaws horizontally outwardly to release the said lowermost container after the next higher container is engaged by the upper jaws;
6. move the stripper fingers horizontally inwardly and vertically downwardly to engage the released lowermost container; and
7. advance the conveyor to successively position a row of container receiving sockets below the lower jaw assemblies.

11. Apparatus according to claim 10 in which said means for reciprocating said movable cam plates comprises rods connected to said vertically movable actuating bar, and a rotatable cam for moving said actuating bar vertically, said cam being carried by a shaft which is synchronized with movement of the conveyor.

12. Apparatus according to claim 11 in which:
an actuator lever is mounted for vertical swinging in cooperation with said rotatable cam which is upright and the lever carries a cam follower for engaging said cam,
a connection between said lever and said common actuating bar, and a cylinder and piston unit connected to said lever and normally biasing it to a position where the cam follower engages the cam but operable to swing the lever to a position to space the follower from said cam.

* * * * *